United States Patent
Rostrup-Nielsen et al.

(10) Patent No.: US 7,481,857 B2
(45) Date of Patent: Jan. 27, 2009

(54) CARBON MONOXIDE CONVERSION PROCESS AND REACTOR

(75) Inventors: Thomas Rostrup-Nielsen, Copenhagen K (DK); Erik Løgsted-Nielsen, Copenhagen NV (DK)

(73) Assignee: Haldor Topsoe A/S, Lyngby (DK)

( * ) Notice: Subject to any disclaimer, the term of this patent is extended or adjusted under 35 U.S.C. 154(b) by 415 days.

(21) Appl. No.: 11/453,001

(22) Filed: Jun. 15, 2006

(65) Prior Publication Data
US 2006/0230680 A1 Oct. 19, 2006

Related U.S. Application Data

(62) Division of application No. 10/435,592, filed on May 12, 2003, now Pat. No. 7,252,693.

(30) Foreign Application Priority Data
May 16, 2002 (DK) .............................. 2002 00748

(51) Int. Cl.
*B01J 8/00* (2006.01)
(52) U.S. Cl. .................. 48/61; 48/198.3; 48/197 R; 48/127.9; 422/200; 422/201; 422/202; 165/115; 165/118
(58) Field of Classification Search ......... 422/200–202, 422/198; 48/61; 165/115, 118
See application file for complete search history.

(56) References Cited

U.S. PATENT DOCUMENTS

| | | | |
|---|---|---|---|
| 4,519,448 A * | 5/1985 | Allo et al. .................... | 165/118 |
| 4,520,866 A * | 6/1985 | Nakajima et al. ............ | 165/115 |
| 4,564,064 A * | 1/1986 | Allo et al. .................... | 165/118 |
| 4,932,468 A * | 6/1990 | Ayub ........................... | 165/118 |
| 5,525,322 A | 6/1996 | Willms | |
| 5,705,916 A | 1/1998 | Rudbeck et al. | |

(Continued)

FOREIGN PATENT DOCUMENTS

DE 977 499 9/1966

(Continued)

OTHER PUBLICATIONS

M. Bracht, et al., "Water Gas Shift Membrane Reactor for $CO_2$ Control in IGCC Systems; Techno-economic Feasibility Study", *Energy Conversion and Management*, vol. 38, No. 1001, 1997, pp. S159-164.

*Primary Examiner*—Alexa Neckel
*Assistant Examiner*—Kaity V. Handal
(74) *Attorney, Agent, or Firm*—Dickstein Shapiro LLP

(57) ABSTRACT

Process and reaction unit for isothermal shift conversion of a carbon monoxide containing feed gas, the process comprising the steps of introducing the feed gas in a reaction unit into reactor tubes with a fixed bed of a shift conversion catalyst in a reaction zone;

Figure 1:
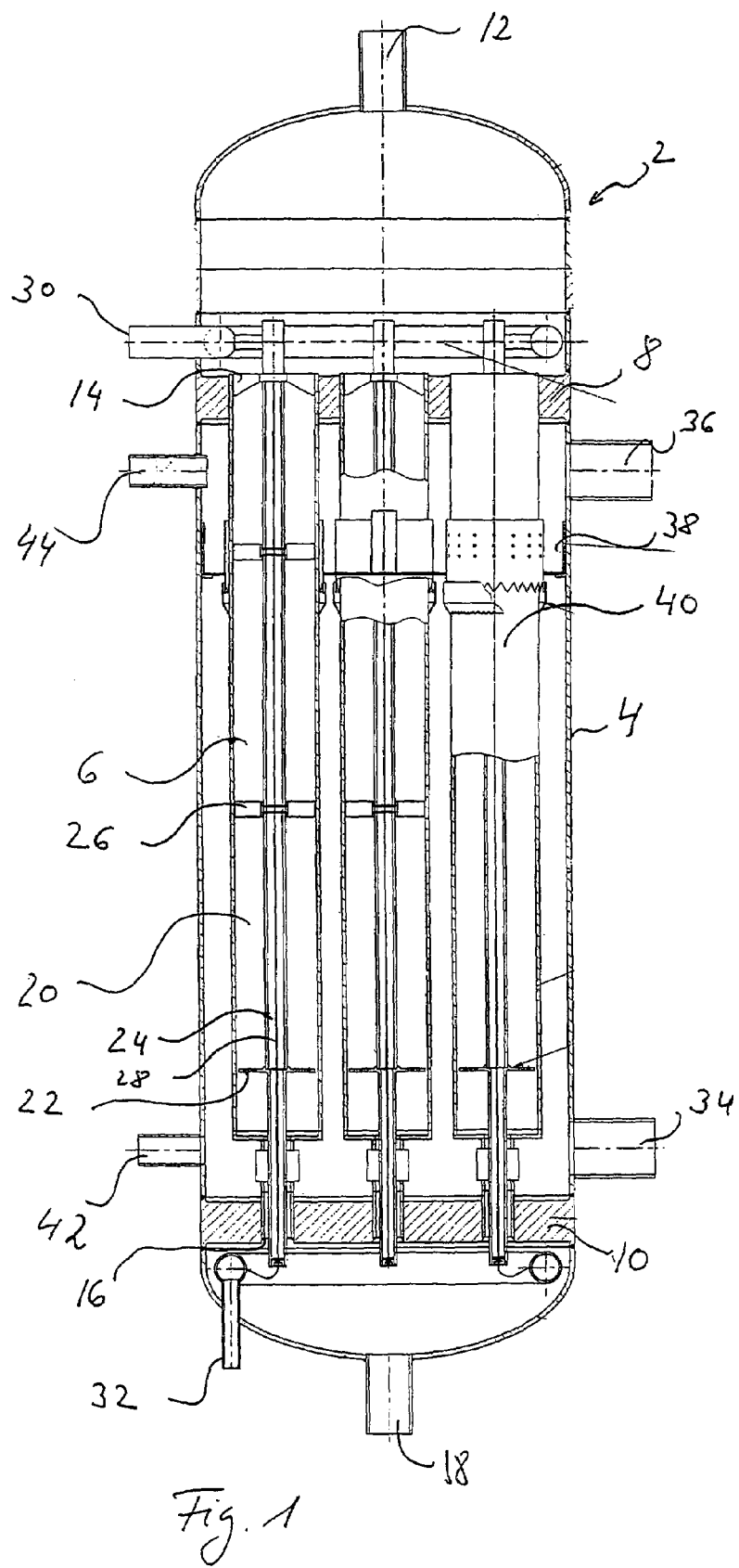

contacting the feed gas with the catalyst at conditions being effective in carbon monoxide shift conversion reaction with steam reactant to hydrogen and cooling the reaction by indirect heat exchange with a cooling agent by passing the cooling agent in a falling film along shell side of the reactor tubes and removing heated cooling agent from the falling film;

passing hydrogen when it is formed by the shift conversion reaction through a hydrogen selective membrane to a permeate zone;

withdrawing hydrogen from the permeate zone and carbon monoxide depleted feed gas from the reaction zone.

4 Claims, 2 Drawing Sheets

| U.S. PATENT DOCUMENTS | | | |
|---|---|---|---|
| 6,033,634 A | 3/2000 | Koga | |
| 6,089,312 A * | 7/2000 | Biar et al. | 165/118 |
| 6,090,312 A | 7/2000 | Ziaka et al. | |
| 6,594,897 B2 | 7/2003 | Kim et al. | |

| FOREIGN PATENT DOCUMENTS | | | |
|---|---|---|---|
| DE | 43 39 882 | 5/1995 | |
| EP | 0 334 792 | 9/1989 | |
| WO | WO 99/34898 | 7/1999 | |
| WO | WO 99/61397 | 12/1999 | |

* cited by examiner

CARBON MONOXIDE CONVERSION PROCESS AND REACTOR

This is a divisional of application Ser. No. 10/435,592, filed May 12, 2003 now U.S. Pat. No. 7,252,693.

The present invention is directed to a process with improved conversion of carbon monoxide to hydrogen from a carbon monoxide rich process stream by the carbon monoxide shift reaction in presence of a catalyst.

In particular the invention relates to a process and reaction unit for isothermal shift conversion of a carbon monoxide containing feed gas with simultaneous membrane separation of formed hydrogen from reacting feed gas.

The shift reaction

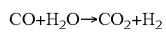

$$CO + H_2O \rightarrow CO_2 + H_2$$

is exothermic and favoured by lower temperatures and lower temperatures increase CO-conversion. Thus, the lower the temperature the more a synthesis gas will be shifted towards $CO_2$ and $H_2$ provided that the gas is contacted with a sufficiently active shift catalyst. It is common practice to distinguish between carrying out the shift reaction at below 300° C. (typically 200-300° C., low temperature shift) and above 300° C. (typically 300-500° C., high temperature shift). For these reasons, in many industrial plants that produce and/or utilise hydrogen, it is common practice to have a high-temperature shift unit for bulk CO-conversion, then cooling by steam generation followed by a low temperature shift unit to ensure a more complete CO-conversion.

To control reaction temperature and for reasonable reaction rates, heat of reaction must be removed. The conventional shift process is therefore performed in two steps with intermediate heat removal between catalyst beds.

In traditional process designs the shift process is performed in a first high temperature shift reactor with an iron-chromium catalyst at 320-380° C. Due to the exothermic shift reaction, temperature in the shifted gas increases by 50-80° C. and is then cooled to about 200° C. for a subsequent second low temperature shift reaction by contact with a copper-zinc-alumina catalyst. The final content of carbon monoxide in the effluent gas from the low temperature shift reaction is usually in the range of 0.1-0.3 vol %.

The achieved hydrogen purity by the conventional two-stage shift process is about 92%.

For some applications the achievable hydrogen purity in the conventional shift process is too low and a third shift reaction stage has to be added in the above process design. It has also been suggested increasing water content in the process by continuous humidifying the gas to obtain minimum concentration of carbon monoxide (WO 9961397). Both of the above measures influence process costs in a negative way.

Several improvements to the conventional high temperature-low temperature shift process have been suggested in the art.

U.S. Pat. No. 5,525,322 discloses a method to produce ultrapure hydrogen from water and from hydrocarbons by water gas shift with a palladium membrane and a nickel catalyst in a reactor to drive the reaction to substantial completion by removing the product hydrogen from the reacting mixture.

A plate type high-temperature shift converter with a shift reaction chamber filled with a high-temperature shift catalyst, a cooling chamber with a filler for promoting heat transfer and into which a cooling gas is introduced and a partition for separating the shift reaction chamber and the cooling chamber are shown in U.S. Pat. No. 6,033,634. The shift reaction chamber has a hydrogen gas chamber separated by a plate type partition composed of a porous plate and a hydrogen permeable palladium film. Thus, only hydrogen generated in the shift reaction chamber permeates the hydrogen permeable film into the hydrogen gas chamber.

The general object of this invention is to obtain improved carbon monoxide conversion to hydrogen in the above known shift process by a combination of controlling reaction temperature isothermally and removing hydrogen product continuously by means of a hydrogen selective membrane. A further object of the invention is to provide a reaction unit for use in isothermal membrane shift processes.

In accordance with the above objects the invention is a process for isothermal shift conversion of a carbon monoxide containing feed gas comprising the steps of introducing the feed gas in a reaction unit into reactor tubes with a fixed bed of a shift conversion catalyst in a reaction zone;

contacting the feed gas with the catalyst at conditions being effective in carbon monoxide shift conversion reaction with steam reactant to hydrogen and cooling the reaction by indirect heat exchange with a cooling agent by passing the cooling agent in a falling film along shell side of the reactor tubes and removing heated cooling agent from the falling film;

passing hydrogen when it is formed by the shift conversion reaction through a hydrogen selective membrane to a permeate zone;

withdrawing hydrogen from the permeate zone and carbon monoxide depleted feed gas from the reaction zone.

Suitable catalysts for use in the inventive process comprise the known high or low temperature shift catalysts based on copper-zinc-aluminum oxides, copper-zinc-chromium oxides and iron-chromium oxide as commercially available from Haldor Topsøe A/S.

In a preferred embodiment of the invention cooling of the reaction zone is performed in evaporative manner by means of boiling water as cooling agent. In such an embodiment water may be applied as falling film to reactor tubes containing a shift catalyst and constituting the reaction zone.

As an advantage when employing a falling film of water as the cooling agent, steam generated during cooling of the hot reactor tubes can partly be used as reactant in the shift reaction. Thereby, the feed gas is passed on shell side of the reactor tubes and humidified with the steam formed in the falling film water-cooling agent.

The humidified feed gas is subsequently introduced to tube side of the reactor tubes and reacted as described in more detail below. The carbon monoxide containing feed gas can also contain steam and the amount of steam in the feed gas can be increased by humidifying the feed gas with the steam formed in the falling film of water as described above.

A further advantage of the boiling water-cooling is that part of steam generated can be utilised as sweep gas in the permeate zone. The sweep gas lowers the partial pressure of hydrogen and hence increases the permeation rate of hydrogen from the catalyst bed to the permeate zone and improves recovery of hydrogen.

Figure 2:
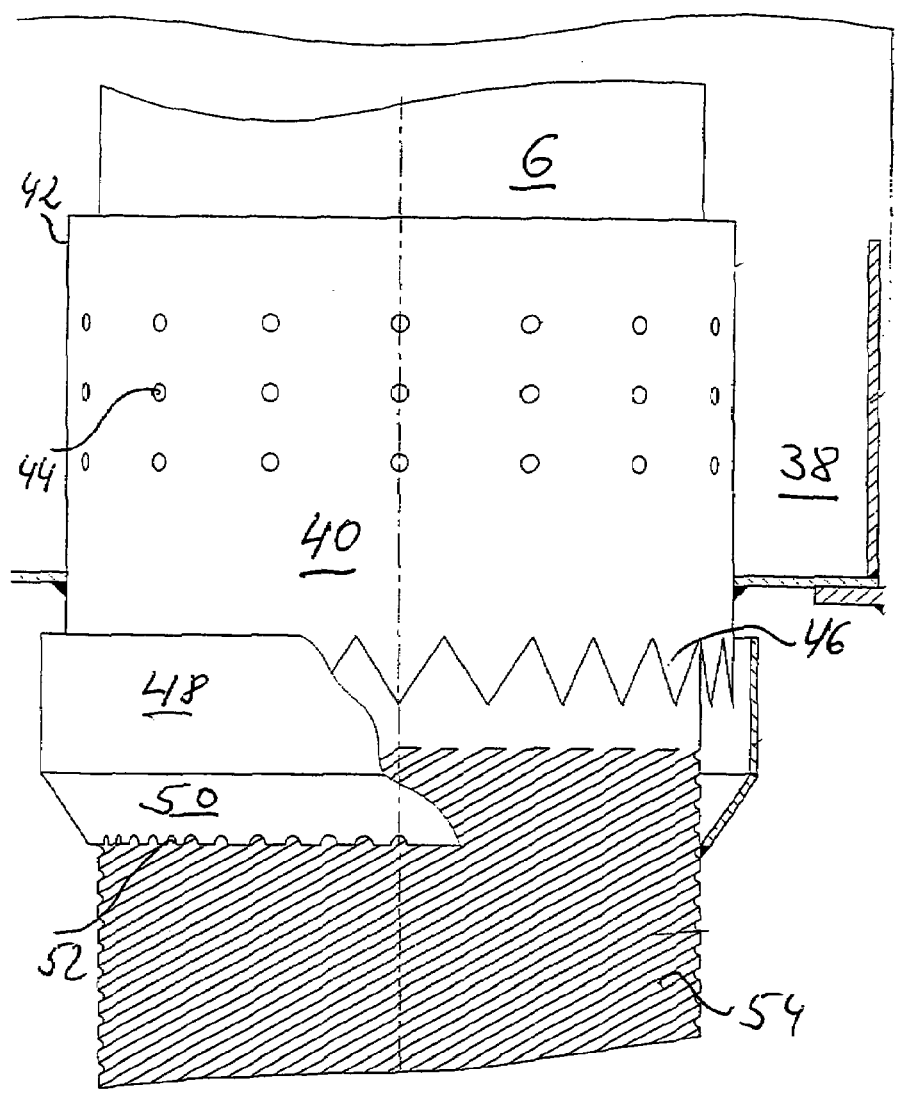

The above and further features and advantages of the invention will become more apparent from the following detailed description with reference to the drawing, in which FIG. 1 is a cross sectional view through a reaction unit according to one embodiment of the invention; and FIG. 2 shows in more detail a top segment of a reactor tube in the reaction unit with a cooling agent distribution assembly employed in a reaction unit of the invention.

Referring now to FIG. 1, an isothermal membrane shift reactor 2 comprises within a cylindrical shell reactor tubes 6 arranged between top tube sheet 8 and bottom tube sheet 10.

Each tube 6 is supplied with carbon monoxide containing feed gas through feed gas inlet channel 12 at top of reactor 2 and inlet 14 at top of tube 6. Reacted feed gas is withdrawn through outlet 16 in tube 6 and main outlet pipe 18 in the reactor shell.

Each tube 6 is furthermore provided with a catalyst bed 20 of an appropriate shift catalyst supported on support plate 22. Within tube side of the reactor tube is arranged a central hydrogen permeable membrane tube 24. The membrane tube is rigidly held in place by means of intermediate supports 26.

The feed gas is reacted within tubes 6 as described above by contact with shift catalyst in catalyst bed 20. Hydrogen being formed by the shift reactions is continuously withdrawn from catalyst bed 20 through permeation to permeate side 28 of the membrane tube 24 and recovered through hydrogen outlet channel 30 connected to each membrane tube at top of reactor tubes 6.

In order to increase reaction rate hydrogen is swept off from permeate side 28 with a sweep gas as described herein before. The sweep gas is introduced into the membrane tubes through inlet 32 connected to bottom of each membrane tube 24.

As mentioned above, the shift reaction is strongly exothermic and needs cooling to obtain reasonable conversion of feed gas. By the inventive shift reactor the reaction is performed substantially isothermal through cooling of the reactor tubes with a liquid cooling agent. The cooling agent is in indirect heat exchange with the reacting gas when being supplied to shell side of the reactor tubes through pipe 34. Heated cooling agent is withdrawn from pipe 36 and externally cooled (not shown) before being recycled to the reactor via inlet 34.

In a specific embodiment of the invention the reaction is cooled by boiling water in a falling film reactor. Cooling water is thereby introduced at top portion of the reactor through pipe 36 on distribution tray 38 and distributed to wall of each reactor tube 6 by means of distribution assembly 40 being described in more detail below by reference to FIG. 2. By the falling film reactor feed gas being introduced into the reactor can be humidified with steam reactant when passing the feed gas prior to introduction into the reactor tubes. Dry feed gas is by this embodiment of the invention introduced into the rector via inlet 42 and passed upwardly along shell side of the reactor tubes to distribution tray 38 and humidified withdrawn from the reactor in pipe 44 via chimneys (not shown) being provided in tray 38 for passage of the humidified gas. The humidified gas is finally passed into the reactor as described above.

FIG. 2 is an exploded section showing the upper portion of a reactor tube 6 arranged within distribution tray 38 and distribution assembly 40.

Assembly 40 consists of a distribution sleeve 42 with perforations 44 and serrated drip edge 46 fitting into a dosing sleeve 48.

A cooling agent e.g. water is by the above assembly supplied as a falling film along shell side of tubes 6 from tray 38 via perforations 44 in sleeve 42. To provide for even distribution of the cooling agent on the whole circumference of the tubes, outlet end 50 of sleeve 48 fits to wall of tube 6 and the cooling agent is distributed through cuts 52 in edge of dosing sleeve 48.

Cooling agent leaving sleeve 48 is circumferentially distributed to wall of tube 6 by means of grooves 54 provided in at least upper portion of the tube wall.

The invention claimed is:

1. Reaction unit comprising a reactor with a reactor shell; within a reactor shell one or more reactor tubes adapted to hold a fixed bed of a shift conversion catalyst and to exchange heat by indirect heat contact with a cooling agent in a falling film along shell side of the reactor tube, the upper end of the reactor tubes on the shell side being provided with a cooling agent distributor in the form of a perforated sleeve being arranged on shell side concentrically and spaced apart from the wall of the tubes, and a dosing means in the form of a sleeve with a conical outlet end concentrically with the tube wall; wherein the cooling agent distributor is fitted into the dosing means a hydrogen permeable membrane tube concentric arranged within the reactor tube with a permeation zone on shell side of the membrane tube being in contact with the catalyst bed and a permeate zone on tube side of the membrane tube; on the reactor shell inlet means for a carbon monoxide containing feed gas connected to inlet of the catalyst bed and outlet means for carbon monoxide depleted feed gas connected to outlet of the catalyst bed; outlet means for hydrogen containing permeate connected to the permeate zone of the membrane tube; inlet and outlet means for the cooling agent, the inlet means being adapted to introduce the cooling agent to shell side of the reactor tubes.

2. Reaction unit according to claim 1, further comprising inlet means for a sweep gas connected to the permeation zone of the membrane tube.

3. Reaction unit according to claim 2, further comprising a first pipe connected to the outlet means for the heated cooling agent and a second pipe connected to the inlet means for the sweep gas.

4. Reaction unit according to claim 1, further comprising a first pipe connected to the outlet means for the heated cooling agent a second pipe connected and to the inlet means for the feed gas.

\* \* \* \* \*